(12) United States Patent
Swanson et al.

(10) Patent No.: US 6,313,595 B2
(45) Date of Patent: Nov. 6, 2001

(54) METHOD OF CONTROLLING AN INTELLIGENT ASSIST DEVICE IN A PLURALITY OF DISTINCT WORKSPACES

(75) Inventors: Peter Swanson, Lake Orion; H. Dean McGee, Rochester Hills, both of MI (US)

(73) Assignee: Fanuc Robotics North America, Inc., Rochester Hills, MI (US)

( * ) Notice: Subject to any disclaimer, the term of this patent is extended or adjusted under 35 U.S.C. 154(b) by 0 days.

(21) Appl. No.: 09/767,978

(22) Filed: Jan. 23, 2001

Related U.S. Application Data

(63) Continuation-in-part of application No. 09/458,294, filed on Dec. 10, 1999, now Pat. No. 6,204,620.

(51) Int. Cl.[7] .................................................. G05B 19/19
(52) U.S. Cl. ........................................................ 318/568.11
(58) Field of Search .......................... 318/568.11, 568.21; 254/1; 701/301

(56) References Cited

U.S. PATENT DOCUMENTS

| | | | |
|---|---|---|---|
| 3,904,042 | 9/1975 | Colston | 214/1 CM |
| 4,305,028 | 12/1981 | Kostas et al. | 318/565 |
| 4,403,281 | 9/1983 | Holmes et al. | 364/170 |
| 4,486,843 | 12/1984 | Spongh et al. | 364/513 |
| 4,625,285 | 11/1986 | Mori et al. | 364/513 |
| 4,694,230 | 9/1987 | Slocum et al. | 318/568 |
| 4,744,719 | 5/1988 | Asano et al. | 414/730 |
| 5,130,632 | 7/1992 | Ezawa et al. | 318/568.11 |
| 5,442,269 | 8/1995 | Takayama et al. | 318/568.11 |
| 5,544,282 | * 8/1996 | Chen et al. | 395/90 |
| 5,739,811 | 4/1998 | Rosenberg et al. | 345/161 |
| 5,834,917 | 11/1998 | Yasui et al. | 318/568.11 |
| 5,836,064 | * 11/1998 | Winker et al. | 29/33 P |
| 5,865,426 | 2/1999 | Kazerooni | 254/270 |
| 5,880,956 | 3/1999 | Graf | 364/191 |
| 6,004,016 | * 12/1999 | Spector | 364/167.02 |
| 6,104,158 | 8/2000 | Jacobus et al. | 318/568.11 |

* cited by examiner

*Primary Examiner*—Jeffrey Donels
*Assistant Examiner*—Rita Leykin
(74) *Attorney, Agent, or Firm*—Howard & Howard

(57) ABSTRACT

A method of controlling a powered manipulator in a plurality of workspaces is disclosed. The manipulator includes a handle, a motor, a force sensor, and is in combination with a processor controlling the manipulator. The method includes the steps of imparting force on the control handle, sensing direction and magnitude of the force, and sending data of the force to the processor. The data is processed to establish movement commands for the manipulator. The processor is programmed to establish at least one virtual constraint in a first workspace for limiting movement of the manipulator to prevent an operator from moving the manipulator to a limit of this workspace. After the manipulator is moved in this workspace, the manipulator is relocated from the first workspace into a second workspace different from the first workspace where the manipulator is then moved again. To limit movement of the manipulator in the second workspace, the at least one virtual constraint established in the first workspace is repositioned to the second workspace.

33 Claims, 4 Drawing Sheets

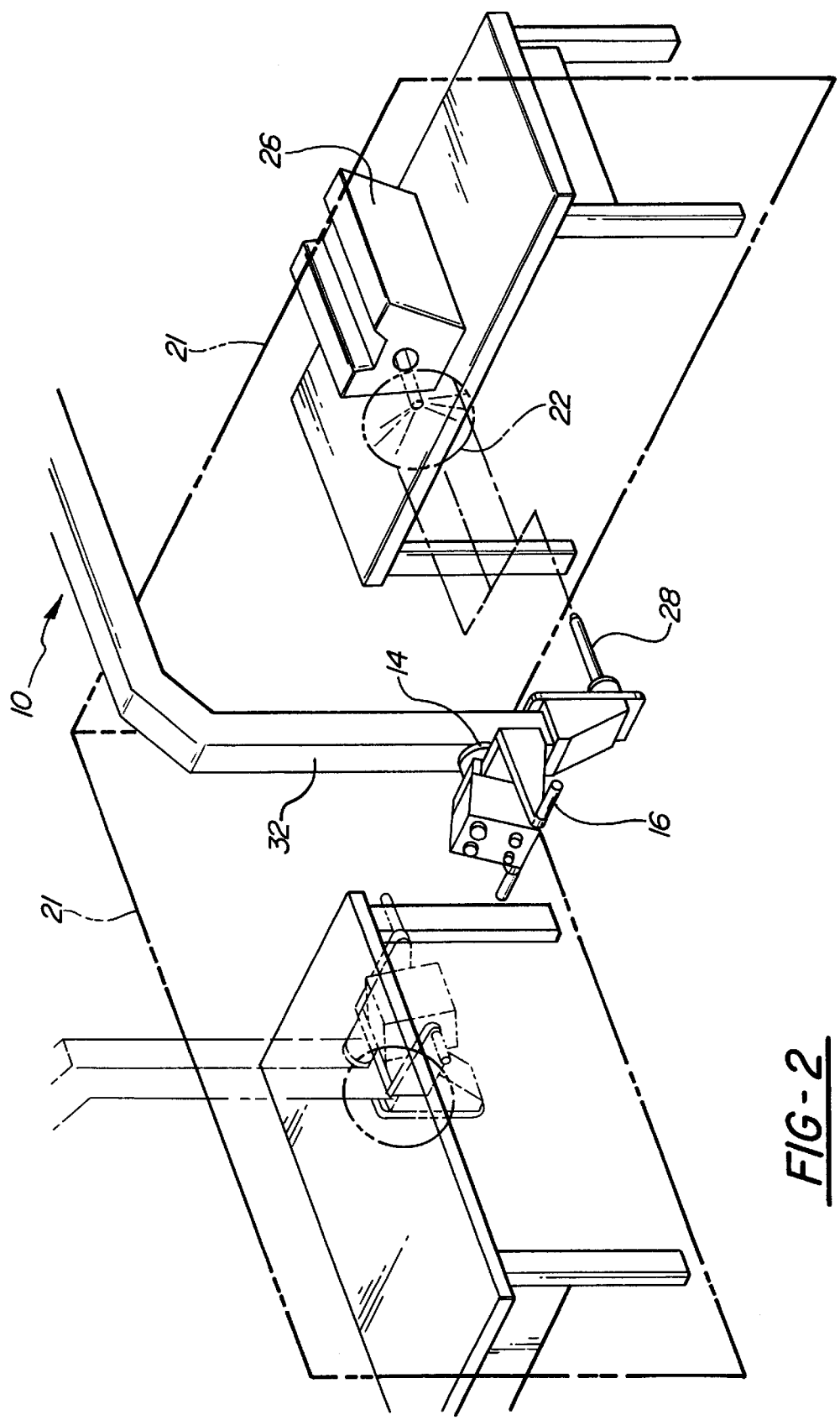

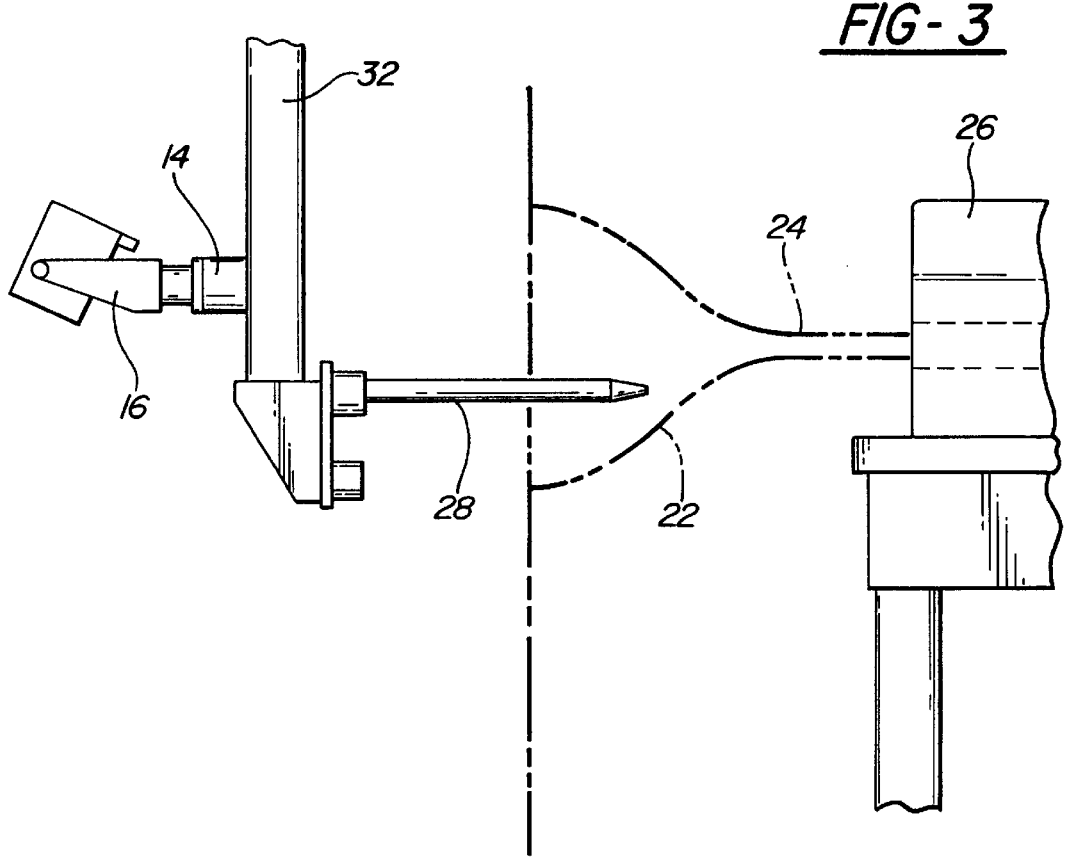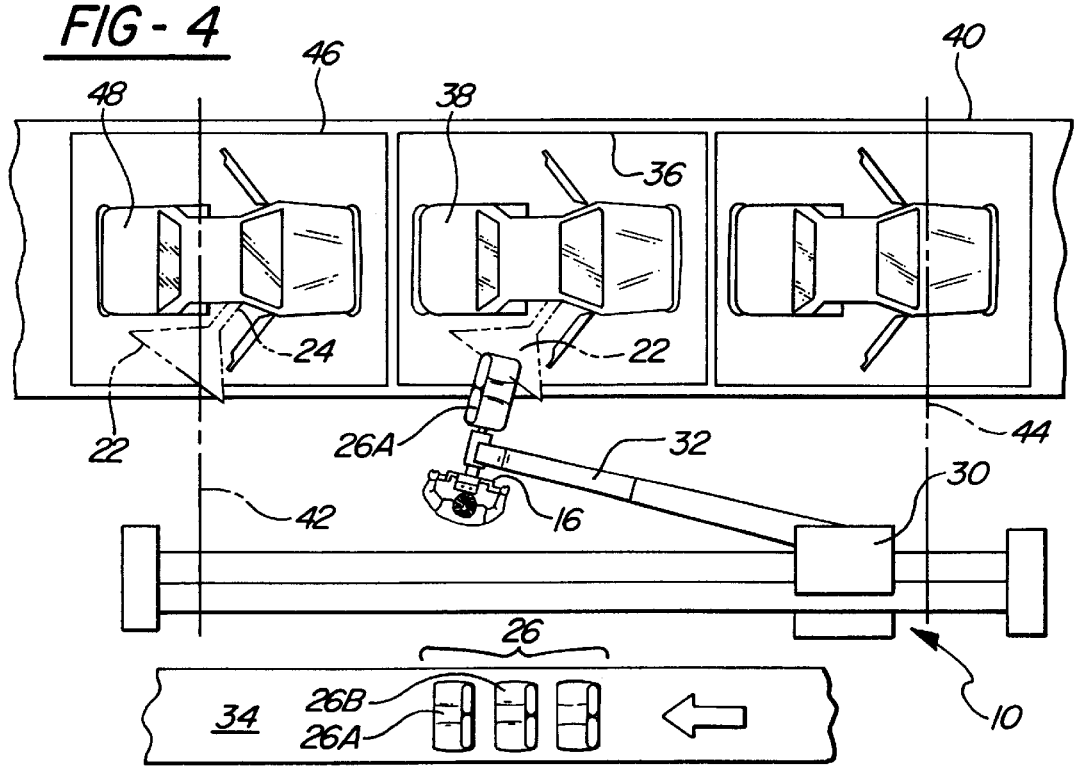

METHOD OF CONTROLLING AN INTELLIGENT ASSIST DEVICE IN A PLURALITY OF DISTINCT WORKSPACES

RELATED APPLICATIONS

The present application is a continuation-in-part of U.S. patent application Ser. No. 09/458,294 which was filed on Dec. 10, 1999 now U.S. Pat. No. 6,204,620 and is entitled "Method Of Controlling An Intelligent Assist Device."

BACKGROUND OF THE INVENTION

1. Field of the Invention

The subject invention relates to the method of controlling a powered manipulator within a plurality of distinct workspaces. More specifically, the subject invention relates to establishing and repositioning at least one virtual constraint from a first workspace to a second workspace such that movement of the powered manipulator in the second workspace is limited to prevent the operator from moving the powered manipulator to at least one physical limit of the second workspace.

2. Description of the Prior Art

The moving of heavy objects from one location to another traditionally is accomplished by the use of a powered manipulator or more typically, an unpowered manipulator that utilizes overhead rails or a bridge gantry with a carriage movably supported thereon. An arm is pivotally attached to the carriage to lift the objects from overhead. When moving a heavy object, it is desirable to have the operator as close to the object as possible to make movement of the object more intuitive as if the operator was actually lifting and moving the object. To this end, it is desirable to utilize power assisted manual manipulators.

Methods to control a power assisted manual manipulator must provide adequate operator safety and still provide an intuitive human interface. One method of controlling an assist device is comprises the steps of utilizing an actuator to sense the required force for lifting a load, providing an end-effector to interface between a human operator and the load, engaging the load with the end effector, detecting a magnitude of human force imparted by the operator on the end-effector as the operator lifts the load and using the magnitude of the human force to regulate the actuator and cause the actuator to lift the load. This method utilizes the imparted force by the operator to govern the force provided to assist in lifting the load. In this way an operator maintains the feel of lifting the load and moving it but exerts only enough force to control the moving of the load.

Another method of moving a load is exemplified by a power assist device used by an operator to pick up an instrument panel off a rack and guide the instrument panel into a vehicle cabin for attachment therein. The operator does not support the weight of the instrument panel and is free to move the instrument panel around the workspace without constraint. The deficiency in this method is that there is no restraint on powered manipulator motion. As a result, the power assist device can be freely wielded by the operator, and the operator may inadvertently move the instrument panel into anything, damaging both the instrument panel and whatever the panel hits.

The above methods are further deficient in that they are unable to adjust easily to compensate for parts with particular features that vary from part-to-part, or they are unable to adjust easily to compensate for parts that are disposed on a support rack in varying positions each time. Also, these methods are unable to track an assembly line as the assembly line is operating or these methods rely on the operator to apply the equivalent force required to match a speed of the assembly line.

SUMMARY OF THE INVENTION AND ADVANTAGES

A method of controlling a powered manipulator in a plurality of distinct workspaces is disclosed. At a minimum, the plurality of distinct workspaces includes a first workspace and a second workspace that is different from the first workspace. The powered manipulator utilized in the method of the subject invention includes a control handle, at least one motor, and at least one force sensor. The powered manipulator is utilized in combination with a processor that controls the powered manipulator.

The method of the subject invention includes the steps of imparting a force on the control handle which is preferably accomplished by an operator either pushing or pulling on the control handle to impart the force. The direction and magnitude of the force on the control handle are sensed by the force sensor. Next, the data, which is indicative of the direction and magnitude of the force, is sent to the processor. The direction and magnitude data from the force sensor is processed to established movement commands for the powered manipulator. Furthermore, the processor is programmed to establish at least one virtual constraint in the first workspace. The established virtual constraint limits movement of the powered manipulator in the first workspace to prevent an operator from moving the powered manipulator to at least one physical limit of the first workspace. As such, movement of the powered manipulator is limited as the powered manipulator moves in the first workspace in response to the movement commands from the processor.

The method of the subject invention continues by relocating the powered manipulator from the first workspace into the second workspace. The powered manipulator moves in the second workspace also in response to the movement commands from the processor. The method is characterized by repositioning the established at least one virtual constraint from the first workspace to the second workspace upon relocation of the powered manipulator. Movement of the powered manipulator in the second workspace is limited. Limitation of the movement of the powered manipulator in the second workspace prevents the operator from moving the powered manipulator to at least one physical limit of the second workspace.

Accordingly, by repositioning the virtual constraint from the first workspace to the second workspace, the subject invention provides a method that is able to compensate for parts with varying features from part-to-part, and for parts that are placed on support racks in varying positions from time-to-time. The subject invention also provides a method for tracking an assembly line as the assembly line is operating without requiring the operator to apply forces to the powered manipulator used in this method to keep up with or match the speed of the assembly line.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a perspective view of the intelligent assist device within a first workspace including two-dimensional virtual walls and a three-dimensional virtual tunnel connected with a three-dimensional virtual funnel;

FIG. 3 is a sectional view of the intelligent assist device moving within the three-dimensional virtual funnel that is connected with the three-dimensional virtual tunnel;

FIG. 4 is an overhead view of the intelligent assist device being used on an operating assembly line to track a first assembly unit, in this Figure a car body, on the operating assembly line.

DETAILED DESCRIPTION OF THE PREFERRED EMBODIMENT

Referring to the Figures, wherein like numerals indicate like or corresponding parts throughout the several views, a method of controlling a powered manipulator 10 in a plurality of distinct workspaces is disclosed. The powered manipulator 10 may be controlled according to the method of the subject invention in any number of distinct workspaces. For descriptive purposes only, the subject invention will be described below in terms of a first workspace and a second workspace wherein the second workspace is different than the first workspace. As will be appreciated fully below, a workspace may be defined as any operational area where the powered manipulator 10 functions. In terms of the subject invention, it is only important that one workspace differ from other workspaces in any manner. As an example, although a first and second workspace may be the same operational area, for purposes of the subject invention, the first and second workspaces would be different if a foreign obstacle present in the first workspace was not present in the second workspace.

Figure 1:
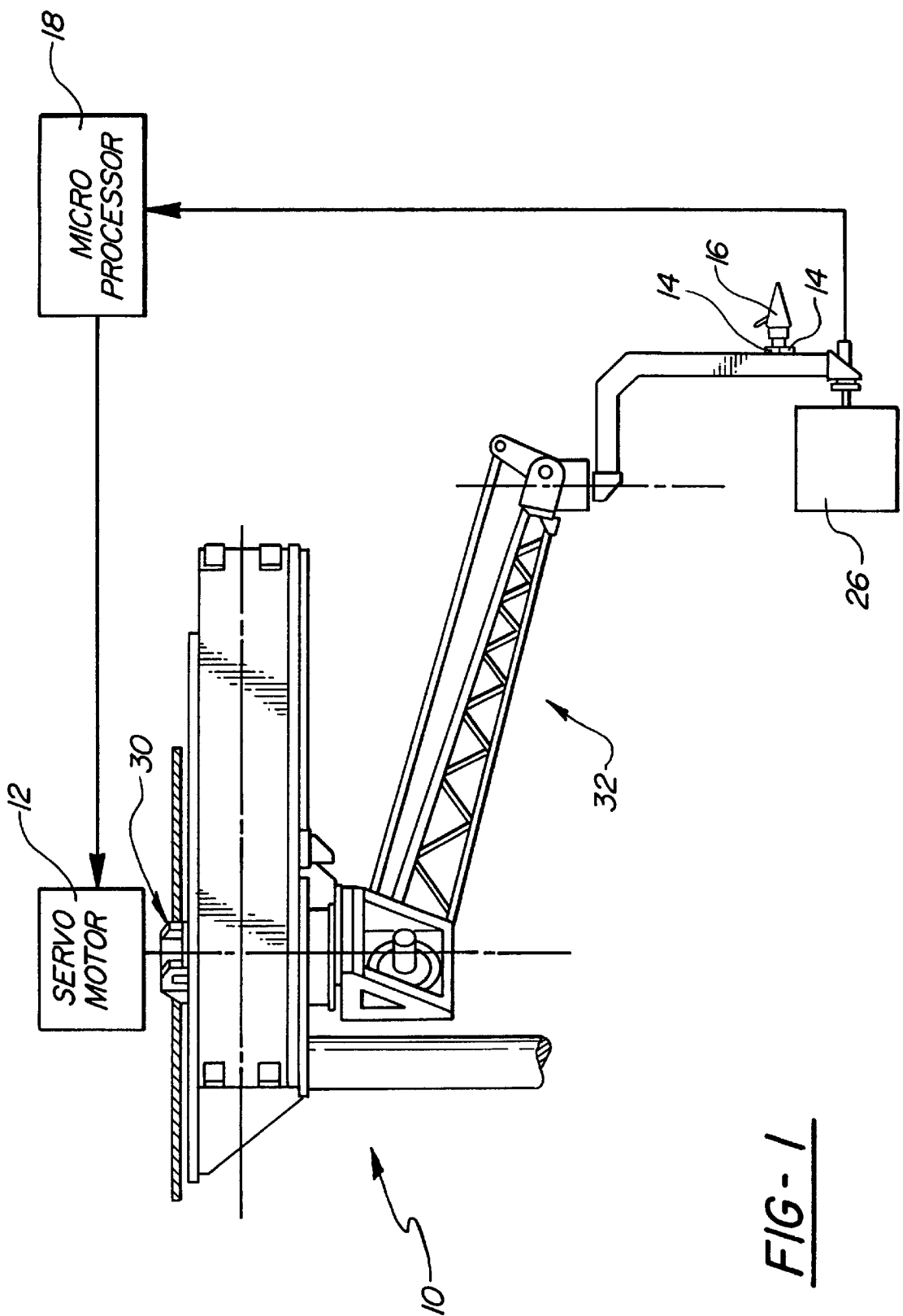
FIG. 1 is a perspective view of a powered manipulator, specifically an intelligent assist device.

Referring primarily to FIG. 1, the powered manipulator 10 includes at least one motor 12, and at least one force sensor 14 disposed on a control handle 16. Although not required, the powered manipulator 10 utilized in the subject invention preferably includes a plurality of force sensors 14 disposed on the control handle 16. The powered manipulator 10 is utilized in combination with a processor 18 that controls the powered manipulator. Preferably, the processor 18 is a microprocessor 18 and will be described below as such. However, any other suitable computer processor may also be selected without varying the scope of the subject invention.

The specific type of powered manipulator 10 referred to is an intelligent assist device (IAD) 10. The IAD 10 includes a movable base 30 supporting a lift mechanism 32 for moving a workpiece 26. The motor 12 actuates the lift mechanism 32 to move the workpiece 26. For descriptive purpose only, the subject method invention will be described below in terms of a single servomotor 12. The lift mechanism 32 also supports the control handle 16. The control handle 16 of the IAD 10 receives various inputs from an operator. The plurality of force sensors 14 are preferably disposed between the control handle 16 and the lift mechanism 32 for optimum sensing of the operator inputs.

The method of the subject invention includes the step of imparting a force on the control handle 16. Preferably, the operator imparts the force on the control handle 16 simply by pushing or pulling on the control handle 16. The plurality of force sensors 16 sense a direction and magnitude of the force imparted on the control handle 16. Data, which is indicative of the direction and magnitude of the force imparted on the control handle 16, is sent to the microprocessor 18. This data is then processed in order to establish movement commands for the IAD 10 which are ultimately responsible for the movement of the IAD 10. Movement of the IAD 10 includes both the operator's input as well as powered assistance from the motor 12.

The processing step may optionally include the filtering of some portion of the force imparted on the control handle 16. Filtering accomplishes a smoothing when the IAD 10 is moved by eliminating natural vibrations and sudden inconsistent motions, such as jerks, produced by the operator. These natural vibrations and sudden inconsistent motions are not incorporated into the movement commands that are responsible for movement of the IAD 10. In other words, the optional step of filtering prevents certain operator inputs from being translated into movement commands thereby preventing undesirable jerking or oscillation of the IAD 10.

An adaptive gain feature that proportions the movement commands relative to the force imparted on the control handle 16 may also be included in this processing step. In other words, a specific magnitude of the force imparted on the control handle 16 is translated proportionally into movement commands for the IAD 10. The proportion of the movement commands to the imparted force can be varied as desired in response to a location of the IAD 10 in one of the workspaces, in response to automatic selection triggered by a specific event, or in response to manual selection by the operator. Furthermore, the proportion may be varied in relation to a speed of the IAD 10.

The proportioning discussed above can also change the way that the IAD 10 'feels' to the operator. More specifically, the proportion can be adjusted such that a small amount of force imparted by the operator can result in large and fast movements of the IAD 10. Alternatively, the proportion can be adjusted such that a large amount of force imparted by the operator is required even to make small moves of the IAD 10. The proportion can also be dependent on dynamic motion states such as speed, velocity, acceleration, and the like. It should be appreciated that proportioning allows for fine control of the IAD 10 at low speeds and better control of the IAD 10 at high speeds. The proportion can also be varied with settings based on operator skill level, the tasks to be performed, interaction with virtual constraints, which are discussed below, regions in the workspace, sensor input, or other criteria. The proportion changes smoothly over time to allow the operator to adjust to the new feel and prevent jerky motion. Additionally, adjusting the feel of the IAD 10 generally allows for more intuitive control of the IAD 10.

The microprocessor 18 is programmed to establish at least one virtual constraint in the first workspace. For descriptive purposes only, the subject invention will be described below only in terms of a single virtual constraint. However, it is to be understood that the microprocessor 1 8 can also be programmed to establish a plurality of virtual constraints. More specifically, the plurality of virtual constraints is a grouping of individual virtual constraints into a first arrangement of virtual constraints. The virtual constraint limits movement of the IAD 10 in the first workspace thereby preventing the operator from moving the IAD 10 to at least one physical limit of the first workspace.

To limit movement of the IAD 10 in the first, or in any, workspace, the movement commands for the IAD 10 are modified in response to the relationship between the location of the IAD 10 in the workspaces and the established virtual constraint. For instance, the movement commands for the IAD 10 may be modified by varying the speed of the IAD 10 in response to the location in the workspaces and the virtual constraint. Modification of the movement commands by the microprocessor 18 is accomplished by determining a predicted trajectory of the IAD 10 according to the imparted force on the control handle 16. As appreciated, the predicted trajectory is the trajectory or path that the IAD 10 would move in the absence of the established virtual constraint. The predicted trajectory is compared to the position of the established virtual constraint, and then the movement commands are modified to provide a resultant trajectory which is the trajectory or path in which the IAD 10 actually moves. The step of providing the resultant trajectory in response to modified movement commands occurs continuously as the IAD 10 is moved throughout the workspaces. In sum, the established virtual constraint and the modification of the movement command for the IAD 10 in response to the relationship between the IAD 10 and the established virtual constraint assist the operator in guiding the IAD 10 to, or near, as specific point.

Although the virtual constraint can be of any suitable shape, whether the shape is two or three-dimensional, it is to be understood that the virtual constraint is preferably selected from the group consisting of two-dimensional virtual walls 21, two-dimensional virtual parallelograms, three-dimensional virtual funnels 22, three-dimensional virtual tunnels 24, and three-dimensional virtual spheres, and combinations thereof. The virtual constraint can also be established with decreasing cross-sectional area where the area within the virtual constraint is progressively decreased to terminate at the specific point where the operator desires to move the IAD 10.

Referring to FIG. 2, the virtual constraint is the two-dimensional virtual wall 21 that is typically established to define outer limits of a particular workspace. Two-dimensional virtual constraints, such as the two-dimensional virtual wall 21, can also be place entirely around known obstacles within the workspace to prevent collisions with the IAD 10. The three-dimensional virtual constraints can be established to form any desired three-dimensional shape. For example, referring to FIG. 3, the three-dimensional virtual funnel 22 is utilized to guide the IAD 10 to the specific point. As also shown in FIG. 3, the three- dimensional virtual tunnel 24 is shown in combination with the three-dimensional virtual funnel 22. In other words, the three-dimensional virtual funnel 22 leads into the three-dimensional virtual tunnel 24 that extends to the workpiece 26. Both the three-dimensional virtual funnel 22 and the three-dimensional virtual tunnel 24 define tolerance limits in which the IAD 10 is allowed to move. FIG. 3 also illustrates that the shape of the virtual constraint can be customized depending on specific application requirements and on the specific workpiece 26. In this Figure, the IAD 10 includes an end of arm tool 28 tailored to fit the workpiece 26 and is guided into the workpiece 26 by the three-dimensional virtual funnel 22 leading into the three-dimensional virtual tunnel 24. Although not shown in the Figures, three-dimensional virtual spheres can be used when it is desired to control certain performance characteristics of the IAD 10, such as speed and adaptive gain dependent on the location of the IAD in one of the workspaces. The three-dimensional virtual sphere establishes an area within the workspaces where the performance characteristics of the IAD 10 are controlled according to a specific task.

With the virtual constraint established in the first workspace, the IAD 10 is moved in the first workspace in response to the movement commands from the microprocessor 18. After the operator moves the IAD 10 within the first workspace to accomplish whatever particular task requires completion in the first workspace, the IAD 10 is relocated from the first workspace into the second workspace. At this point, the operator indicates to or 'notifies' the microprocessor 18 that the IAD 10 has been relocated into the second workspace.

The operator can manually indicate to the microprocessor 18 that the IAD 10 has been relocated into the second workspace, or this indication can be realized automatically. Automatic indication of relocation will be discussed further below. As an example of manual indication to the microprocessor 18, the operation can simply depress or otherwise activate a relocation indication device on the control handle 16, not shown in the Figures, that notifies the microprocessor 18 that the relocation of the virtual constraint has taken place. More specifically, the operator first manually locates a reference point in the second workspace, called the second reference point. Once the second reference point has been located, the operator activates the relocation indication device. At this point, the microprocessor 18 determines a position of the second reference point relative a position of a first reference point in the first workspace where the IAD 10 originally was located. It is to be understood that the first and second reference points can be directly on the workpiece 26 positioned in the workspaces, or the first and second reference points can be on carriers positioned in the workspaces that support the workpieces. Once the microprocessor 18 determines the position of the second reference point relative to the first reference point, the virtual constraint can be accurately repositioned. Repositioning of the virtual constraint is described in greater detail below.

As alluded to above, it is also possible to automatically indicate to the microprocessor 18 that the IAD 10 has been relocated. To accomplish this, the subject invention may incorporate a sensing device that automatically senses that the IAD 10 has been relocated into the second workspace. Suitable sensing devices include, but are not limited to, vision sensors, encoders, and other discrete or continuous sensors. As with manual indication, the position of the second reference point in the second workspace relative to the first reference point must still be determined. Once the position of the second reference point has been determined, the virtual constraint is repositioned, either manually or automatically. In this embodiment, it is preferred that the virtual constraint be automatically repositioned from the first workspace to the second workspace according to the determined position of the second reference point.

To reposition the virtual constraint, the subject invention programs the microprocessor 18 to establish a first reference frame in the first workspace. The first reference frame is associated with the established virtual constraint in the first workspace. After the first reference frame is established, and after the IAD 10 has been relocated from the first workspace into the second workspace, the microprocessor 18 establishes a second reference frame in the second workspace. The first reference frame is compared to the second reference frame to determine a position of the second workspace relative to the first workspace, and the virtual constraint is repositioned from the first workspace to the second workspace according to the determined position of the second workspace relative to the first workspace.

As with the indication of relocation, repositioning of the virtual constraint can be manual or automatic. That is, repositioning can occur automatically or not until the operator takes steps to ensure that repositioning of the virtual constraint from the first workspace to the second workspace takes place. For instance, the operator may manually activate a switching device that repositions the virtual constraint from the first workspace to the second workspace according to the determined position of the second reference point relative to the first reference point. Alternatively, the virtual constraint can be automatically repositioned once the microprocessor 18 is aware that the IAD 10 has been relocated into the second workspace. In either situation, manual or automatic repositioning of the virtual constraint, if there is only a single virtual constraint that has been repositioned into the second workspace, then this virtual constraint is essentially the same virtual constraint as the virtual constraint from the first workspace except that it has been repositioned in some manner. If, on the other hand, there is an arrangement of more than one virtual constraint, then it is the entire arrangement of virtual constraints that is repositioned, and the repositioned arrangement can be different from the arrangement of virtual constraints in the first workspace simply by including at least one different virtual constraint.

Once the virtual constraint is repositioned from the first workspace to the second workspace upon relocation of the IAD 10, movement of the IAD 10 in the second workspace in response to movement commands from the microprocessor 18 is limited to prevent the operator from moving the IAD 10 to at least one physical limit of the second workspace. Movement of the IAD 10 is limited in the second workspace in the same manner in which movement of the IAD was limited in the first workspace.

Figure 5:
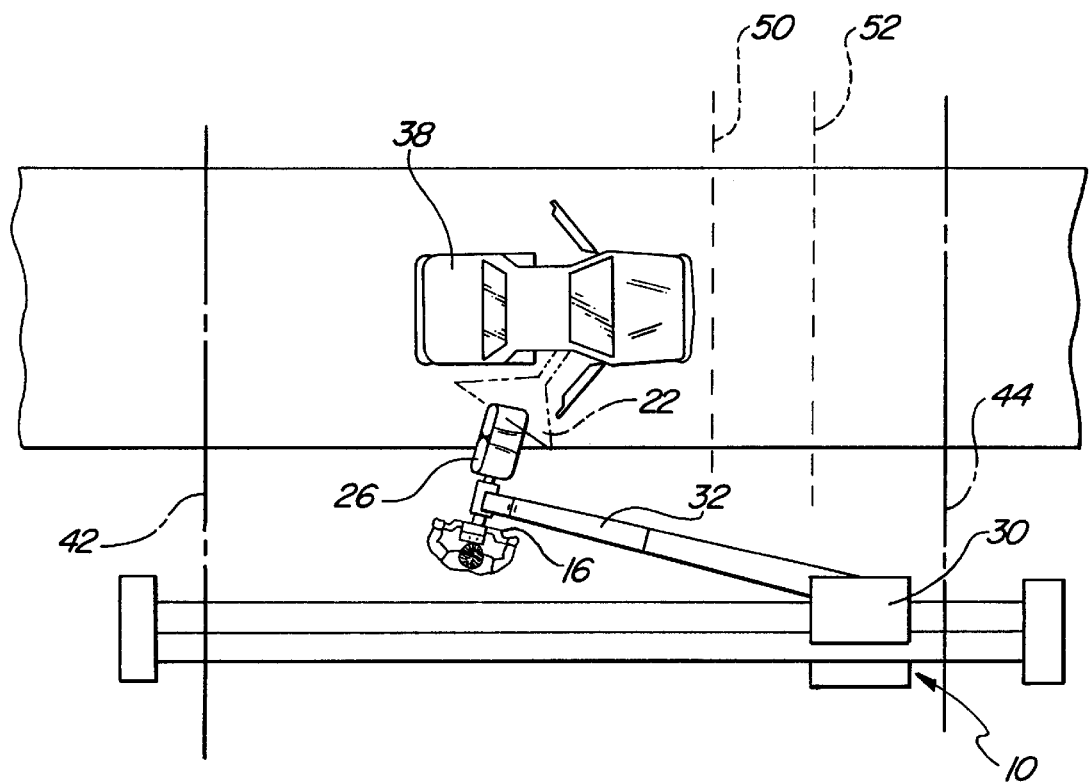
FIG. 5 is an overhead view of the intelligent assist device illustrating a range of travel of the intelligent assist device that corresponds to upstream and downstream limits of the operating assembly line.

Referring to FIGS. 4 and 5, the subject invention is also able to track a specific moving point within the workspace and to reposition the virtual constraint in view of this specific moving point, which is known in the industry as line-tracking or a line tracking method. The specific moving point may be the point at which the operator is required to mount or assemble the workpiece 26. As such, the virtual constraint may be disposed at any position within the workspace in view of the specific moving point. To accomplish line-tracking with the virtual constraint, the microprocessor 1 8 is programmed to establish a first tracking frame 36. The first tracking frame 36 is established in relation to a first assembly unit 38, such as an automobile body 38. Once established, the first tracking frame 36 moves with the first workspace along the operating assembly line 40 to track the first assembly unit 38 as the first assembly unit 38 moves along on the operating assembly line 40. The operating assembly line 40 includes a particular operating rate as well as an upstream 42 and downstream 44 limit. The virtual constraint is related to, or virtually attached with, the first tracking frame 36. As such, the virtual constraint moves with the first tracking frame 36 and the first workspace along the operating assembly line 40.

The IAD 10 moves toward the operating assembly line 40 at a particular velocity, and in the preferred embodiment of the line tracking method, the velocity of the IAD 10 is increased as the IAD moves toward the assembly line 40 within the first workspace. More specifically, the velocity of the IAD 10 is increased incrementally until the velocity matches the operating rate, whatever the operating rate is, of the assembly line 40. In other words, as the IAD 10 approaches the assembly line 40 from the side, the velocity of the IAD 10 scales incrementally from zero to 100 percent of the operating rate of the assembly line 40. As such, when the IAD 10 is some predetermined distance from the assembly line 40, the velocity is zero. That is, there is no velocity offset and the IAD 10 will be stationary unless the operator moves the IAD 10. On the other hand, when the IAD 10 is within the predetermined distance from the assembly line 40, the IAD 10 moves in concert with the assembly line 40 once the velocity of the IAD 10 achieves 100 percent of the operating rate of the assembly line 40. The increase in velocity of the IAD 10 is incremental such that there is a smooth gradation toward 100 percent.

The microprocessor 18 is also programmed to establish a second tracking frame 46 to track a second assembly unit 48 on the operating assembly line 40. The second tracking frame 46 is established in relation to the second assembly unit 48 and operates identically to the first tracking frame 36. That is, the second tracking frame 46 moves with the second workspace along the operating assembly line 40 to track the second assembly unit 48 as the second assembly unit 48 moves along on the operating assembly line 40. The virtual constraint is virtually attached with the second tracking frame 46 such that the virtual constraint moves with the second tracking frame 46 and the second workspace along the operating assembly line 40.

The line tracking method introduced above will be described in greater detail with reference to FIG. 4. In particular, FIG. 4 illustrates how the line tracking method can be used on the operating assembly line 40 to mount or assemble workpieces 26 to the automobile bodies 38, 48 which are moving on and with the operating assembly line 40. A part detect switch, or other equivalent device, informs the microprocessor 18 that the first automobile body 38 is present on the assembly line 40, and with this information, the microprocessor 18 establishes the first tracking frame 36 in relation to the first automobile body 38. A first workpiece 26A is removed from an external storage area 34, such as an external assembly line, and moved by the operator toward the first automobile body 38. Notice that the first workpiece 26A is labeled in two places in FIG. 4 for descriptive purposes. The movement of the first automobile body 38 along the operating assembly line 40, which in this example is equal to the operating rate of the assembly line 40, is detected by a remote sensor, or even by a sensor attached to the IAD 10, of any kind known in the art, such as a tracking encoder, and information representative of this movement is relayed to the microprocessor 18. With the information representative of the movement of the first automobile body 38, the microprocessor 18 moves the first tracking frame 36 with the first workspace along the operating assembly line 40 to track the movement of the first automobile body 38 on the operating assembly line 40.

The microprocessor 18 establishes the virtual constraint in relation to the specific moving point which is a final assembly point for the first workpiece 26A in the first automobile body 38. Although the final assembly point remains static relative to the first automobile body 38, the final assembly point is moving with the operating assembly line 40. As such, the microprocessor 18 attaches the virtual constraint to the first tracking frame 36 such that the virtual constraint moves with the first tracking frame 36 and the first workspace along the operating assembly line 40. The virtual constraint decreases the free movement available to the operator as the operator moves the IAD 10 closer to the first automobile body 38. The operator then moves the first workpiece 26A to the final assembly point where the first workpiece 26A is to be mounted or assembled to the first automobile body 38. At the final assembly point, the virtual constraint limits movement of the IAD 10, and thereby limits movement of the first workpiece 26A which is supported on the IAD 10, to the tolerance or physical limits of the first workspace required to assemble the first workpiece 26A to the first automobile body 38.

Throughout the entire line tracking method, the IAD 10 tracks the first automobile body 38 and the virtual constraints are moved relative to the final assembly point. This relieves the operator from the burden of imparting the exact force required to track the assembly line 40 and allows the operator to devote full attention to assembling the first workpiece 26A to the first automobile body 38. Furthermore, in limiting the movement of the IAD 10, the virtual constraint ensures that the first workpiece 26A will not inadvertently hit the first automobile body 38.

A second workpiece 26B can be mounted to a second automobile body 48 on the same operating assembly line 40. The part detect switch informs the microprocessor 18 that the second automobile body 48 is present on the assembly line 40, and with this information, the microprocessor 18 establishes the second tracking frame 46 in relation to the second automobile body 48. The second workpiece 26B is removed from the external storage area 34 and moved by the operator toward the second automobile body 48. Like the first automobile body 38, the movement of the second automobile body 48 is detected by the remote sensor and is relayed to the microprocessor 18, and the microprocessor 18 moves the second tracking frame 46 with the second workspace along the operating assembly line 40 to track the movement of the second automobile body 48 on the operating assembly line 40.

The microprocessor 18 also establishes the virtual constraint in relation to the final assembly point for the second workpiece 26B in the second automobile body 48. Specifically, the microprocessor 18 attaches the virtual constraint to the second tracking frame 46 such that the virtual constraint moves with the second tracking frame 46 and the second workspace along the operating assembly line 40. Then, the second workpiece 26B can be mounted or assembled to the second automobile body 48 while the movement of the IAD 10, which supports the second workpiece 26B, is limited to the physical limit of the second workspace.

Referring now to FIG. 5, the IAD 10 has a particular range of travel necessary to mount or assemble the workpieces 26 to the automobile body 38. The subject invention incorporates certain interlocks 50, 52 to prevent the range of travel of the IAD 10 from exceeding these interlocks 50, 52. These interlocks 50, 52 relate to the upstream 42 and downstream 44 limits of the operating assembly line 40. Furthermore, these interlocks 50, 52 guarantee the safety of the operator and prevent damage to the IAD 10. To accommodate the operators working on the operating assembly line 40, the operating rate of the assembly line 40 may be slowed as the range of travel of the IAD 10 approaches the downstream limit 44 of the operating assembly line 40. In other words, if the operator has not accomplished the specific task to be accomplished, e.g. the mounting of the workpiece 26 to the automobile body 38, the range of travel of the IAD required to follow the automobile body 38 on the operating assembly line 40 will exceed the interlock 50 and the operating rate of the assembly line 40 can be slowed until the operator completes the task. The operator is also signaled, either audibly or visually, that the range of travel of the IAD 10 has exceeded the interlocks 50, 52 and is approaching the downstream limit 44. Finally, operation of the assembly line 40 may be stopped when the range of travel of the IAD 10 exceeds the downstream limit 44 of the operating assembly line 40. Stoppage of the operation of the assembly line 40 can be temporary, i.e., only a pause, if the range of travel only exceeds the downstream limit 44 by an accepted tolerance. On the other hand, stoppage of the operation of the assembly line 40 can be permanent if the range of travel exceeds the downstream limit 44 outside of the accepted tolerance where it is then necessary to reset the entire system, IAD 10 and assembly line 40. It is to be understood that the upstream 42 and downstream 44 limits of the assembly line 40 arc designated as such merely for descriptive purposes and that this terminology may be interchanged.

The subject invention also includes the use of virtual constraints to control how, and not just where, the IAD 10 can move. Control of how the IAD 10 moves includes varying the speed and the resultant trajectory in relation to the location of the IAD 10 within the established virtual constraint. This capability provides for the reduction of speed as the IAD 10 approaches the established virtual constraint to eliminate abrupt stops, and provides for the virtual constraint to have a virtual friction much like sliding friction in a physical environment. This capability is desirable to optimize intuitive guiding of the IAD 10. As appreciated, when the operator feels the speed of the IAD 10 decreasing and feels friction without a corresponding reduction in the imparted force, it will be understood that the virtual constraint is being approached and the operator will be able to change the direction of the IAD 10 to avoid the virtual constraint.

It is also desirable to limit the speed of the IAD 10 in the interest of operator safety and efficiency. It may be desirable to limit the speed of the IAD 10 when the workpiece 26 is being carried to prevent the workpiece 26 from falling off and injuring the operator or becoming damaged. Alternatively, it may be desirable to limit the speed of the IAD 10 to prevent the workpiece 26 from creating undesirable inertial forces that would hinder control of the IAD 10 and endanger the operator.

Operator safety during control of the IAD 10 when the IAD 10 is at an established virtual constraint is of significant concern. This concern is created by the magnitude of the force imparted by the operator being directly converted to motion along a surface of the virtual constraint thereby causing the IAD 10 to move in a different direction than the operator intends. This may be caused by the modification of the movement commands in relation to the virtual constraint. As described above, the predicted trajectory of movement is substituted with a modified movement command defined to move the IAD 10 away from or along the virtual constraint. Standard movement commands for the IAD 10 at the virtual constraint are modified to move the IAD 10 in a different direction than the force imparted on the control handle 16 by the operator. The force imparted by the operator in moving the IAD 10 against the virtual constraint would be modified to a movement command that would move the IAD 10 laterally along the virtual constraint. To remedy this concern, a speed limit of zero is introduced along the virtual constraint that requires the operator to back the IAD 10 off of the virtual constraint before proceeding. Alternatively, the speed limit of the IAD 10 along the virtual constraint may also be set at a very slow rate to allow the IAD 10 to move along the virtual constraint only at a slow speed, thereby enabling the operator to more effectively control the IAD 10.

The subject invention also provides for the establishment of multiple arrangements of dynamic virtual constraints that may be activated on a real-time basis by selecting a specific arrangement of virtual constraints either manually or automatically. Arrangements of dynamic virtual constraints that are activated on a real-time basis contrast with static virtual constraints in that the arrangement of dynamic virtual constraints is always present in the work area. Arrangements of dynamic virtual constraints allow the operator to activate a specific virtual constraint depending on the task to be performed.

In operation, real-time dynamic virtual constraints allow the operator to activate arrangements of virtual constraints that are specific to the task being performed. The selection of the specific arrangement of virtual constraints can be accomplished by an operator manually activating a switch disposed on the control handle 16 to engage a particular arrangement of virtual constraints for guiding the IAD 10 in picking up the workpiece 26. This switch can then be deactivated to remove the arrangement and allow the operator free movement within the workspace. Further, it also conceived to be within the subject invention to automatically activate a specific arrangement of virtual constraints with a sensor, with a physically actuated switch, or logically when specific conditions are met. Automatic activation will occur when the operator approaches the workpiece 26 with the IAD 10.

In addition to constructing an arrangement of virtual restraints that restricts the movement of the IAD 10, the subject invention further provides for establishment of a virtual coordinate system to reposition forces in order to establish a preferred center of rotation in which the IAD 10 is moved in response to operator inputs. Additionally, establishment of the virtual coordinate system allows the positioning of the virtual coordinate system anywhere relative to the IAD 10. The position of the virtual coordinate system may even be varied which allows for positioning of the virtual coordinate system to provide for more intuitive movement of the workpiece 26. When the workpiece 26 is not being moved, the virtual coordinate system can be placed directly on the IAD 10. When the workpiece 26 is being moved, the virtual coordinate system may be positioned on the workpiece 26 that is being moved by the IAD 10. Therefore, movement commands can be interpreted in relation to the virtual coordinate system centered on the workpiece 26. As such, when the operator rotates the IAD 10, the center point of that rotation can be placed on the center point of the workpiece 26, thus eliminating inertia created by moving the workpiece 26 that is extended a distance from the center of rotation. Further, once the IAD 10 is unloaded, the virtual coordinate system can be centered back onto the IAD 10, restoring the intuitive control of the IAD 10.

The subject invention also limits the torque available from the motor 12 of the IAD 10 to prevent the movements of the IAD from overpowering the operator or to limit potential collision damage between the IAD 10 and foreign obstacles in the workspace. In other words, the torque available to the IAD 10 is restricted below physical limitations of the motor 12 to provide for operator safety so that movements of the IAD 10 do not exceed the strength of the operator. Also, undue contact forces exerted by the IAD 10 during collisions are prevented by limiting the torque available from the motor 12. The motor 12 is also utilized as a collision detection device that senses a motor torque reading above a specified limit to signal to the microprocessor 18 that a collision has occurred and to disable movement of the IAD 10 and to prevent operator injury.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims. Furthermore, the reference numerals are merely for convenience and are not to be in any way to be read as limiting.

What is claimed is:

1. A method of controlling a powered manipulator in a plurality of workspaces wherein the powered manipulator includes a control handle, at least one motor, and at least one force sensor, and is in combination with a processor that controls the powered manipulator, said method comprising the steps of:

imparting a force on the control handle;

sensing a direction and magnitude of the force on the control handle with the force sensor and sending data indicative of the direction and the magnitude to the processor;

processing the direction and magnitude data from the force sensor to establish movement commands for the powered manipulator;

programming the processor to establish at least one virtual constraint in a first workspace of the plurality of workspaces for limiting movement of the powered manipulator in the first workspace to prevent an operator from moving the powered manipulator to at least one physical limit of the first workspace;

moving the powered manipulator in the first workspace in response to the movement commands from the processor;

relocating the powered manipulator from the first workspace into a second workspace of the plurality of workspaces that is different from the first workspace;

moving the powered manipulator in the second workspace in response to the movement commands from the processor; and said method characterized by repositioning the established at least one virtual constraint from the first workspace to the second workspace upon relocation of the powered manipulator such that movement of the powered manipulator in the second workspace is limited to prevent the operator from moving the powered manipulator to at least one physical limit of the second workspace.

2. A method as set forth in claim 1 further including the step of indicating to the processor that the powered manipulator has been relocated into the second workspace.

3. A method as set forth in claim 2 wherein the step of indicating to the processor that the powered manipulator has been relocated is further defined as manually indicating to the processor that the powered manipulator has been relocated into the second workspace.

4. A method as set forth in claim 3 wherein the step of manually indicating to the processor that the powered manipulator has been relocated is further defined as manually locating a second reference point in the second workspace to determine a position of the second reference point relative to a first reference point in the first workspace.

5. A method as set forth in claim 4 wherein the step of repositioning the established at least one virtual constraint is further defined as manually activating a switching device to reposition the established at least one virtual constraint from the first workspace to the second workspace according to the determined position of the second reference point relative to the first reference point.

6. A method as set forth in claim 2 wherein the step of indicating to the processor that the powered manipulator has been relocated is further defined as automatically indicating to the processor that the powered manipulator has been relocated into the second workspace.

7. A method as set forth in claim 6 wherein the step of automatically indicating to the processor that the powered manipulator has been relocated is further defined as automatically sensing that the powered manipulator has been relocated into the second workspace with a sensing device.

8. A method as set forth in claim 7 further including the step of determining a position of a second reference point in the second workspace relative to a first reference point in the first workspace.

9. A method as set forth in claim 8 wherein the step of repositioning the established at least one virtual constraint is further defined as automatically repositioning the established at least one virtual constraint from the first workspace to the second workspace according to the determined position of the second reference point relative to the first reference point.

10. A method as set forth in claim 1 wherein the step of repositioning the established at least one virtual constraint is further defined as programming the processor to establish a first reference frame in the first workspace that is associated with the established at least one virtual constraint in the first workspace.

11. A method as set forth in claim 10 wherein the step repositioning the established at least one virtual constraint is further defined as programming the processor to establish a second reference frame in the second workspace after the powered manipulator has been relocated from the first workspace into the second workspace.

12. A method as set forth in claim 11 further including the step of comparing the first reference frame to the second reference frame to determine a position of the second workspace relative to the first workspace.

13. A method as set forth in claim 12 wherein the step of repositioning the established at least one virtual constraint is further defined as repositioning the established at least one virtual constraint from the first workspace to the second workspace according to the determined position of the second workspace relative to the first workspace.

14. A method as set forth in claim 1 further including the step of programming the processor to establish a first tracking frame for tracking a first assembly unit on an operating assembly line having an operating rate and an upstream limit and a downstream limit.

15. A method as set forth in claim 14 further including the step of moving the first tracking frame with the first workspace along the operating assembly line to track the first assembly unit.

16. A method as set forth in claim 15 wherein the step of repositioning the established at least one virtual constraint is further defined as virtually attaching the established at least one virtual constraint with the first tracking frame such that the established at least one virtual constraint moves with the first tracking frame and the first workspace along the operating assembly line.

17. A method as set forth in claim 16 further including the step of programming the processor to establish a second tracking frame for tracking, a second assembly unit on the operating assembly line.

18. A method as set forth in claim 17 further including the step of moving the second tracking frame with the second workspace along the operating assembly line to track the second assembly unit.

19. A method as set forth in claim 18 wherein the step of repositioning the established at least one virtual constraint is further defined as virtually attaching the established at least one virtual constraint with the second tracking frame such that the established at least one virtual constraint moves with the second tracking frame and the second workspace along the operating assembly line after the powered manipulator has been relocated from the first workspace into the second workspace.

20. A method as set forth in claim 15 wherein the step of moving the powered manipulator in the first workspace is further defined as increasing a velocity of the powered manipulator as the powered manipulator approaches the operating assembly line.

21. A method as set forth in claim 20 wherein the step of increasing the velocity of the powered manipulator is further defined as incrementally increasing the velocity of the powered manipulator until the velocity matches the operating rate of the operating assembly line.

22. A method as set forth in claim 16 further including the step of mounting a first workpiece to the first assembly unit on the operating assembly line within the physical limit of the first workspace as defined by the at least one established virtual constraint.

23. A method as set forth in claim 19 further including the step of mounting a second workpiece to the second assembly unit on the operating assembly line within the physical limit of the second workspace as defined by the at least one established virtual constraint.

24. A method as set forth in claim 14 wherein the step of moving the powered manipulator in the first workspace is further defined as moving the powered manipulator within a range of travel of the powered manipulator corresponding to and between the upstream and downstream limits of the operating assembly line.

25. A method as set forth in claim 24 further including the step of slowing the operating rate of the operating assembly line as the range of travel of the powered manipulator approaches the downstream limit of the operating assembly line.

26. A method as set forth in claim 24 further including the step of signaling the operator of the powered manipulator as the range of travel of the powered manipulator approaches the downstream limit of the operating assembly line.

27. A method as set forth in claim 24 further including the step of stopping operation of the operating assembly line when the range of travel of the powered manipulator exceeds the downstream limit of the operating assembly line.

28. A method as set forth in claim 1 further including the step of modifying the established movement commands in response to the relationship between a location of the powered manipulator in the first and second workspaces and the established at least one virtual constraint.

29. A method as set forth in claim 28 wherein the step of modifying the established movement commands if further defined as varying a speed of the powered manipulator in response to the relationship between a location of the powered manipulator in the first and second workspaces and the established at least one virtual constraint.

30. A method as set forth in claim 1 further including the step of grouping the established virtual constraints in the first workspace thereby establishing a first arrangement of virtual constraints for limiting movement of the powered manipulator in the first workspace.

31. A method as set forth in claim 30 wherein the step of repositioning the established virtual constraints is further defined as repositioning the first arrangement of virtual constraints from the first workspace to the second workspace.

32. A method as set forth in claim 1 wherein the established at least one virtual constraint is selected from the group of consisting of two-dimensional virtual walls, two-dimensional virtual parallelograms, three-dimensional virtual funnels, three-dimensional virtual tunnels, and three-dimensional virtual spheres, and combinations thereof.

33. A method as set forth in claim 1 further including the step of limiting available torque from the motor of the powered manipulator to limit and prevent movement of the powered manipulator.

* * * * *